Patented Sept. 5, 1939

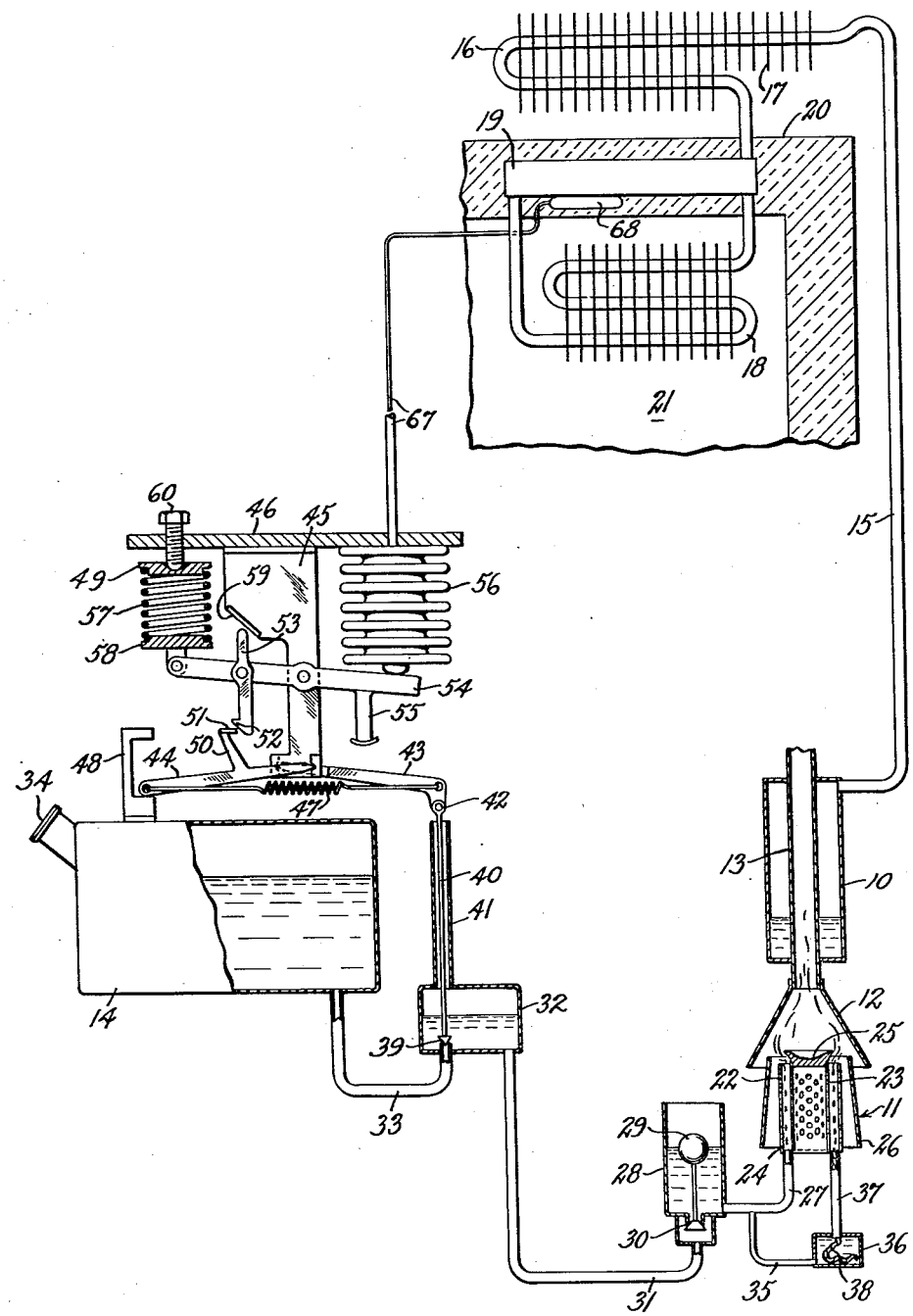

2,171,815

UNITED STATES PATENT OFFICE 2,171,815

REFRIGERATION

Albert R. Thomas, Evansville, Ind., assignor to Servel, Inc., New York, N. Y., a corporation of Delaware Application November 11, 1936, Serial No. 110,195

14 Claims. (Cl. 62—5)

My invention relates to refrigeration, and more particularly to control of intermittently heated refrigeration apparatus.

It is an object of my invention to provide an improved control system which is simple and yet reliable in operation for controlling intermittently heated refrigeration apparatus.

Further objects and advantages of my invention will become apparent from the following description and accompanying drawing forming a part of this specification, and of which the single figure diagrammatically illustrates intermittently heated absorption refrigeration apparatus of a type having alternate periods of expulsion and absorption and provided with a control system embodying my invention.

Referring to the drawing, a generator-absorber 10 is adapted to be heated by a liquid fuel burner 11 which projects a flame into the lower conical-shaped end 12 of a flue 13 which extends vertically upward through the generator-absorber 10. A suitable liquid fuel, such as kerosene, is delivered from a supply vessel 14 to the burner 11, as will be described hereinafter. To the upper part of the generator-absorber 10 is connected a vertically extending conduit 15 which is connected at its upper end to an air-cooled condenser 16 provided with heat transfer fins 17. The condenser 16 is connected to an evaporator 18 including a loop connected to a receiver 19. The receiver 19 may be arranged in a thermally insulated wall 20 of a cabinet, and the loop of the evaporator 18 connected thereto may be arranged in the thermally insulated storage space 21.

The refrigeration apparatus is charged with a solution of refrigerant in an absorption liquid, such as, for example, a thirty per cent solution of ammonia and water. The system operates with alternate periods of absorption of refrigerant and expulsion of refrigerant vapor. During the relatively high pressure vapor expulsion period, the burner 11 applies heat to the generator-absorber 10 whereby refrigerant is expelled out of solution, and the refrigerant vapor flows upward through conduit 15 to the air-cooled condenser 16 in which it is liquefied and accumulates in the evaporator 18.

When the supply of heat to the generator-absorber 10 by the burner 11 is stopped, the generator cools whereby refrigerant is absorbed therein and flows from the evaporator 18 through the condenser 16 and conduit 15 and into the generator-absorber 10. In this absorption period, which is at a reduced pressure, the refrigerant within the evaporator 18 evaporates and takes up heat thereby producing cold. When the temperature of the evaporator 18 increases to a predetermined value during the absorption period, liquid fuel is again delivered to the burner 11 to start a heating period.

The burner 11 comprises two perforated cylinders 22 and 23 arranged concentrically one within the other to provide an annular combustion chamber above a burner well 24. To the upper end of the inner cylinder 23 is fixed a closure member 25, and about the outer cylinder 22 is arranged a frusto-conical shell 26 in any suitable manner. Air drawn upward into the cylinder 23 and the space between cylinder 22 and shell 26 mixes with fuel vaporized in the burner well 24 to provide a combustible mixture.

To the annular burner well 24 is connected the upper end of a conduit 27, the lower end of which is connected to a casing 28. The casing 28 forms a float chamber within which is arranged a float 29 connected to a valve 30 which controls the quantity of liquid fuel delivered through conduit 31 into the float chamber to maintain a constant level of liquid fuel in the casing 28. When the burner is not being operated, the level of liquid fuel in the vertical conduit 27 and burner well 24 is at the same level as the liquid fuel in the casing 28. This level is such that, when the burner is being operated, the flame produced by the burner will apply heat to the generator-absorber 10 at a rate sufficient to effect expulsion of refrigerant vapor. The casing 28 is connected by the conduit 31, vessel 32, and conduit 33 to the supply vessel 14 which is provided with a filling cap 34.

To provide an ignition flame for the burner 11 a conduit 35 is connected to the conduit 27 and a vessel 36 which in turn is connected by a tubular member 37 to the burner well 24. Within the tubular member 37 is provided a wick 35 which extends into the vessel 33 and at its upper end terminates at the burner well 24.

In accordance with my invention, I provide a control system for controlling the flow of liquid fuel from the supply vessel 14 to the burner 11 whereby the alternate periods of expulsion of vapor and absorption of refrigerant are automatically regulated. The control system includes the vessel 32 which is connected to the conduits 33 and 31 and provided with a valve 39 for controlling the flow of liquid fuel from the supply vessel 14 to the vessel 32. The valve 39 is provided with an elongated stem 40 which extends vertically upward within a sleeve 41 forming a part of the vessel 32. The upper end of the stem 40 is pivotally connected at 42 to a short arm at the end of a lever 43 which is adapted to cooperate with a lever 44. The inner pointed ends of levers 43 and 44 are pivoted in notches which are off-set and formed on opposite sides of a downward extending bracket 45 which is fixed at its upper end to a plate 46 which is supported in any suitable manner. The outer end of the lever 43 is off-set with respect to the notch in which it is pivoted and disposed in the same vertical plane as the lever 44, and the outer ends of the levers are connected by a spring 47 to form a snap-acting toggle mechanism. With the levers 43 and 44 in the downwardly inclined position shown in the figure, the valve 39 is in its closed position. When the lever 44 is moved upward against the tension of the spring 47, the levers 43 and 44 will automatically snap into an upwardly inclined position when the lever 44 passes the dead-center position, whereby the valve 39 is moved to its open position. To limit the extent of vertical movement of the lever 44, a C-shaped member 48 is mounted on the supply vessel 14 with the horizontal arms thereof in the path of movement of the outer end of the lever 44.

The lever 44 is provided with an upward extending arm 50 having a tab 51 at its upper end which is adapted to receive a catch 52 formed at the lower end of a vertical lever 53 which is pivotally connected intermediate its ends to one arm of a lever 54. The substantially horizontal lever 54 is pivotally connected to the bracket 45 above and adjacent to the levers 43 and 44, and the right-hand arm thereof is provided with a downward extending part 55 which is adapted to contact the lever 43. The part 55 serves to limit the extent of upward movement of the lever 43 when the lever 44 has been moved upward past the dead-center position. Above the arm of the lever 54 provided with the part 55 is arranged an expansible bellows 56 which is secured to the underside of the plate 46 and provided with an enlarged head at its lower end which is adapted to bear against the outer end of the lever 54. At the opposite end of the lever 54 is provided a helical spring 57 which is fixed between a lower disk 58 having a stud pivotally connected to the outer end of the lever 54 and an upper disk 49 having a central depression to receive the end of a screw 60 which extends through the plate 46. The bellows or element 56 is connected by a tube 67 to a thermal element or bulb 68 which is arranged in thermal contact with the receiver 19 of the refrigeration apparatus. The bulb 68, tube 67, and expansible bellows 56 constitute an expansible fluid thermostat and contain a volatile fluid which increases and decreases in volume with corresponding changes in temperature.

The operation of the control system just described is substantially as follows: Assuming that a heating or vapor expulsion period is in progress, the valve 39 and other parts of the control system are substantially in the position shown in the figure and the vessel 32 contains a quantity of liquid fuel which is isolated from the supply vessel 14 and flows through conduit 31 into the casing 28, and from the latter through conduit 27 to the burner 11. During such heating period refrigerant is expelled out of solution in the generator-absorber 10, is condensed in the condenser 16, and collects in the evaporator 18. When the vessel 32 is empty and liquid fuel no longer flows into the burner well 24 from the conduit 27, the main burner flame is extinguished. Only a small ignition flame is maintained in the burner well 24 at the upper end of wick 38.

When liquid fuel is no longer delivered to the burner well 24 and heat is no longer applied to the refrigeration apparatus, the absorption period starts, as described above, and the evaporator 18 becomes cold. The cooling of the evaporator 18 at the beginning of the absorption period causes the volatile fluid in bulb 68, tube 67, and expansible bellows 56 to become reduced in volume whereby the latter contracts and permits the spring 57 to move the left-hand arm of the lever 54 downward. The left-hand arm of the lever 54 and lever 53 are caused to move downward such a distance that the inclined portion of the catch 52 slides over the upper end of the arm 50 and assumes a substantially vertical position with the catch 52 below the tab 51 formed at the upper end of the arm 50. Upon cooling of the evaporator 18, therefore, the lever 53, which was previously disconnected from the snap-acting toggle mechanism, is now operatively connected to the latter and hence the valve 39.

After a lapse of time and substantially at the termination of the lower pressure period, the ability of the refrigerant to evaporate is reduced, and, due to supply of heat to the evaporator 18, the temperature of the evaporator rises. Upon a rise of the evaporator temperature to about 20° F., for example, the increase in volume of the volatile fluid of the expansible bellows 56 causes the latter to expand and apply force to move the right-hand arm of the lever 54 downward against the tension of the spring 57. With such downward movement of the right-hand arm of the lever 54, the left-hand arm thereof and the lever 53 are moved upward a corresponding distance and effective to move the lever 44 upward against the tension of spring 47 to a position slightly past the dead-center position of the levers 43 and 44. When the lever 44 is moved past the dead-center position of the levers, the spring 47 is effective to snap the levers 43 and 44 into an upwardly inclined position with the outer end of the lever 44 bearing against the upper end of the C-shaped member 48 and with the outer end of the lever 43 bearing against the lower end of the part 55. With such upward movement of the lever 44 the tab 51 is above the catch 52 and no longer in engagement with the latter. The upward movement of the lever 43 opens the valve 39 and permits liquid fuel to flow by gravity from the supply vessel 14 through conduit 33 to fill the vessel 32 which thus serves as a measure for liquid fuel. The fuel flows from the metering vessel 32 through conduit 31 into the casing 28, and from the latter through conduit 27 into the burner well 24. When the level of liquid fuel rises in the conduit 27 and into the burner well 24, it is ignited by the ignition flame at the upper end of the wick 38 to start a heating period.

After the heating period has been started, refrigerant vapor is expelled out of solution and collects in the evaporator 18 after being liquefied in the condenser 16. The refrigerant condensate flowing into the receiver 19 from the condenser 16 is at a relatively high temperature and heats the bulb 68. When the bulb is heated to a temperature, such as 100° F., for example, the increase in volume of the volatile fluid at the beginning of the higher pressure period of vapor expulsion causes further expansion of the expansible bellows 56 to apply additional force to the right-hand arm of the lever 54 whereby the part 55 causes the lever 44 to move downward.

When the part 55 is moved downward due to the further expansion of the expansible bellows 56, the left-hand part of the lever 54 is moved upward a distance sufficient to cause the upper end of the lever 53 to contact and slide along the inclined portion 59 of the bracket 45 before the catch 52 can engage the tab 51, whereby the lever 53 is turned in a counter-clockwise direction and the catch 52 is moved away from the downward path of movement of the tab 51 at the upper end of the arm 50. The angular movement of the lever 53 permits the levers 43 and 44 to be snapped into the downwardly inclined position shown in the figure after the lever 43 has been moved past the dead-center position of the levers.

With the levers 43 and 44 in their downwardly inclined position, the valve 39 is in its closed position whereby fuel no longer flows from the supply vessel 14 to the vessel 32. It will now be understood that a force is applied to the lever 54 by the thermal element 56 to move the valve 39 to its open position, and that a greater force is applied to the lever in the same direction to move the valve to its closed position. During the interval of time the valve 39 is in its open position, liquid fuel from the supply vessel fills the vessel 32, so that a predetermined or metered quantity of liquid fuel is isolated in the vessel 32 when the valve 39 is moved to its closed position, as described above. Liquid fuel is delivered to the burner 11 until the fuel falls below the level of the burner well 24 whereby the burner flame is extinguished. The quantity of liquid fuel isolated in the vessel 32 is such that the burner 11 will continue to supply heat to the generator-absorber 10 for a heating period of the refrigeration apparatus.

It will be clear from the foregoing that the act of metering the supply of heat producing medium, that is, the opening and closing of valve 39 to fill and isolate vessel 32, determines the occurrence and duration of the intervals of heat application to the generator 10, and that the metering occurs automatically upon certain variation in condition in one part of the system, increase in temperature of the evaporator.

Although I have described and illustrated a particular embodiment of a control system for controlling the flow of liquid fuel to the burner of intermittent refrigeration apparatus whereby the alternate periods of expulsion of vapor and absorption of refrigerant are automatically regulated, it will be apparent to those skilled in the art that modifications may be made without departing from the spirit and scope of my invention, as pointed out in the following claims.

What is claimed is:

1. The combination of intermittent absorption refrigeration apparatus, a liquid fuel burner for heating said apparatus, a metering vessel having a volume of fuel determining a heating period, means including conduits for conducting fuel to said vessel and from the latter to said burner, a valve for controlling the flow of fuel to said vessel, and structure for controlling said valve and including a part adapted to have a force applied thereon, said structure being so constructed and arranged that said valve is moved to its open position when a predetermined force is applied to said part and is subsequently moved to its closed position when a greater predetermined force is applied to said part in the same direction as the first-mentioned force.

2. A control for intermittent absorption refrigeration apparatus adapted to be heated by a liquid fuel burner and comprising a metering vessel having a volume of fuel determining a heating period, means including conduits for conducting fuel to said vessel and from the latter to said burner, a valve for controlling the flow of fuel to said vessel, a thermal element, and structure so constructed and arranged that said element is operative to open said valve upon a predetermined rise in temperature and also operative to close said valve upon a further predetermined rise in temperature.

3. A control for intermittent absorption refrigeration apparatus adapted to be heated by a liquid fuel burner and comprising a metering vessel having a volume of fuel determining a heating period, means including conduits for conducting fuel to said vessel and from the latter to said burner, a valve for controlling the flow of fuel to said vessel, a thermal element, and structure including snap-acting means so constructed and arranged that said element is operative to open said valve upon a predetermined rise in temperature and also operative to close said valve upon a further predetermined rise in temperature.

4. In a refrigeration system adapted to be heated by a liquid fuel burner to which liquid fuel is supplied from a metering vessel, the refrigeration system having low pressure periods of refrigerant evaporation and absorption alternating with higher pressure periods of vapor expulsion, that improvement which consists in metering liquid fuel to said vesesl substantially at the termination of a lower pressure period of refrigerant evaporation and terminating such metering of fuel substantially at the beginning of said higher pressure period of vapor expulsion which has been instigated due to the metering of fuel to said vessel, the quantity of fuel thus metered in said vessel being sufficient to render the latter operable to heat said refrigerating system for a higher pressure period of vapor expulsion.

5. A method of controlling a liquid fuel burner adapted to heat a refrigerating system having low pressure periods of refrigerant evaporation and absorption alternating with higher pressure periods of vapor expulsion, which consist in metering fuel and supplying such metered fuel to said burner upon a predetermined increase in temperature at the termination of a lower pressure period of refrigerant evaporation, so that said burner is operable to heat said refrigerating system to instigate a period of vapor expulsion, and terminating the metering of fuel to be supplied to said burner upon a predetermined increase in temperature at the beginning of said higher pressure period of vapor expulsion, the quantity of fuel thus metering and adapted to be supplied to said burner being sufficient to render said burner operable to heat said refrigerating system for a higher pressure period of vapor expulsion.

6. In a refrigeration system of the type driven by heat, a heat receiving part, a liquid fuel burner for heating said part, a metering vessel, means to flow fuel from the metering vessel to the burner, said metering vessel having a volume for fuel determining a heating period and means responsive to a physical condition of the system representing an advanced stage of absorption to fill said metering vessel to start a heating period.

7. In a refrigeration system of the absorption type, a generator, an evaporator, a liquid fuel burner for heating the generator, a metering vessel, means to flow fuel from the metering vessel to the burner, said metering vessel having a volume for fuel determining a heating period and means responsive to evaporator temperature to fill said metering vessel to start a heating period.

8. In a refrigeration system of the type driven by heat, a heat receiving part, a liquid fuel burner for heating said part, a metering vessel, means to flow fuel from the metering vessel to the burner, said metering vessel having a volume for fuel determining a heating period, and means responsive to an effect produced by the refrigeration system to fill said metering vessel to start a heating period.

9. In a refrigeration system of the type driven by heat, a heat receiving part, a liquid fuel burner for heating said part, a source of fuel, a metering vessel having a volume for fuel determining a heating period, said metering vessel being connected to said source of supply to receive fuel therefrom and being connected to said burner to deliver fuel thereto, a closure in the connection between metering vessel and the source of supply, and means to open and close said closure at intervals.

10. In a refrigeration system of the type driven by heat, a first heat receiving part, a liquid fuel burner for heating said part, a second heat receiving part related to the object to be refrigerated, a source of fuel, a metering vessel having a volume for fuel determining a heating period, said metering vessel being connected to said source of supply to receive fuel therefrom and being connected to said burner to deliver fuel thereto, a closure in the connection between metering vessel and the source of supply, and means to open and close said closure at intervals in accordance with temperature changes of the said second heat receiving part.

11. In a refrigeration system of the type driven by heat, a heat receiving part, a liquid fuel burner for heating said part, a source of fuel, a metering vessel having a volume for fuel determining a heating period, said metering vessel being connected to said source of supply to receive fuel therefrom and being connected to said burner to deliver fuel thereto, a closure in the connection between metering vessel and the source of supply, means to open and close said closure at intervals, and a level control interposed between the metering vessel and the burner.

12. The method of controlling an intermittent absorbing system which includes metering a given quantity of liquid fuel sufficient for a heating period, isolating the metered supply and feeding the metered supply to the burner until exhausted, then absorbing with the burner shut off, again metering fuel of the same given quantity in response to a physical condition of the system representing an advanced stage of absorption, and isolating and feeding the second metered supply of fuel to the burner.

13. An independent absorption refrigeration unit including a generator, a heater for the generator, and means responsive to unidirectional variation of condition at one place of said unit for determining the occurrence and duration of periods of operation of said heater for heating the generator of said unit.

14. An intermittent absorption refrigeration system including a generator, a heater for said generator, and means for determining occurrence and duration of periods of operation of said heater solely in accordance with changes in a condition at one place in said system of which said generator forms a part.

ALBERT R. THOMAS.